(12) United States Patent
Ho

(10) Patent No.: US 10,304,059 B2
(45) Date of Patent: May 28, 2019

(54) BIOMETRIC PAYMENT IN TRANSIT SYSTEMS

(71) Applicant: Cubic Corporation, San Diego, CA (US)

(72) Inventor: Patrick Ho, San Diego, CA (US)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 14/823,626

(22) Filed: Aug. 11, 2015

(65) Prior Publication Data

US 2016/0042357 A1 Feb. 11, 2016

Related U.S. Application Data

(60) Provisional application No. 62/036,013, filed on Aug. 11, 2014.

(51) Int. Cl.
*G06Q 30/06* (2012.01)
*G06Q 20/40* (2012.01)
(Continued)

(52) U.S. Cl.
CPC ..... *G06Q 20/40145* (2013.01); *G06Q 20/327* (2013.01); *G06Q 20/352* (2013.01);
(Continued)

(58) Field of Classification Search
USPC .............. 705/24, 75, 21, 1.1, 7.11; 455/411
See application file for complete search history.

(56) References Cited

U.S. PATENT DOCUMENTS 6,119,096 A * 9/2000 Mann .................... E05G 5/003
235/384
2005/0056696 A1 3/2005 Green et al.
(Continued)

FOREIGN PATENT DOCUMENTS

EP 1672557 A1 6/2006
EP 2397995 A1 12/2011
WO 9906928 A1 2/1999

OTHER PUBLICATIONS

International Search Report and Written Opinion of PCT/US2015/044728 dated Nov. 13, 2015, all pages.
(Continued)

*Primary Examiner* — Akiba K Allen
(74) *Attorney, Agent, or Firm* — Kilpatrick Townsend & Stockton LLP

(57) ABSTRACT

A method for conducting biometric transactions includes receiving an indication that a user's media is within a detection range of a transaction device. The indication includes an identifier of the media. A list is populated with identifiers of media that are within the detection range. The list includes the identifier of the user's media along with a subset of an overall population of identifiers of media that are each associated with a particular user and biometric identifier. A biometric identifier is received from the transaction device upon being received by the transaction device in an interaction with the user. The biometric identifier is compared to biometric identifiers of only users associated with identifiers on the list of media to identify the user and an account associated with the user. A transaction using the account associated with the identified user authorized and an authorization message is communicated to the transaction device.

20 Claims, 6 Drawing Sheets

(51) Int. Cl.
    G07B 15/00    (2011.01)
    G06Q 20/38    (2012.01)
    G07F 17/42    (2006.01)
    G06Q 20/32    (2012.01)
    G06Q 20/34    (2012.01)
    G07F 7/10     (2006.01)
    G07F 17/00    (2006.01)
    G07C 9/00     (2006.01)
    G06Q 50/30    (2012.01)

(52) U.S. Cl.
    CPC ........... *G06Q 20/382* (2013.01); *G07B 15/00* (2013.01); *G07C 9/00087* (2013.01); *G07F 7/10* (2013.01); *G07F 17/0014* (2013.01); *G07F 17/42* (2013.01); *G06Q 50/30* (2013.01)

(56) References Cited

U.S. PATENT DOCUMENTS

| | | |
|---|---|---|
| 2005/0205668 A1 | 9/2005 | Sogo |
| 2011/0001827 A1 | 1/2011 | Ortiz et al. |
| 2011/0137773 A1 | 6/2011 | Davis et al. |
| 2011/0208645 A1 | 8/2011 | Knauft |
| 2012/0254040 A1* | 10/2012 | Dixon .................... G07B 15/02 705/44 |
| 2014/0156396 A1* | 6/2014 | deKozan ............ G06Q 30/0261 705/14.53 |
| 2014/0284378 A1* | 9/2014 | Bonneau, Jr. ...... G06K 7/10118 235/375 |
| 2015/0235477 A1* | 8/2015 | Simkin .................. G07B 15/02 705/417 |
| 2015/0262088 A1* | 9/2015 | Smith .................... G06Q 10/02 705/5 |

OTHER PUBLICATIONS

International Preliminary Report on Patentability dated Feb. 23, 2017 for International Patent Application No. PCT/US2015/044728; all pages.

European Search Report dated Feb. 19, 2019 in Patent Application No. 15751272.4, all pages.

\* cited by examiner

BIOMETRIC PAYMENT IN TRANSIT SYSTEMS

CROSS-REFERENCES TO RELATED APPLICATIONS

This application claims priority to U.S. Provisional Patent Application No. 62/036,013 filed Aug. 11, 2014, entitled "BIOMETRIC PAYMENT IN TRANSIT SYSTEMS," the entire disclosure of which is hereby incorporated by reference, for all purposes, as if fully set forth herein.

BACKGROUND OF THE INVENTION

Biometric authentication is used in may systems to secure access to various facilities and/or devices, as well as in the completion of purchase transactions and/or other transactions. While oftentimes successful in smaller applications, when scaled to larger applications, such as transit systems, data lookup time for biometric authentication can take tens of seconds, or even minutes for a single user, as a database of known users to be searched may be on the order of tens or hundreds of thousands. Additionally, the accuracy of conventions biometric authentication systems is not reliable for systems with a large number of registered users. Thus, current techniques of biometric authentication do not provide a feasible solution to large-scale applications, especially those in which speed is essential.

BRIEF SUMMARY OF THE INVENTION

Embodiments of the present invention provide systems and methods for facilitating biometric authentication, identify verification, and/or transactions utilizing biometric authentication. Embodiments of the present invention may include biometric payment or authentication systems and methods that use a patron's location information to enhance processing speed and accuracy.

In one aspect, a method for conducting biometric transactions within a transit system is provided. The method may include receiving an indication that a fare media of a user is within a detection range of a transaction device of the transit system. The indication may include an identifier of the fare media. The method may also include populating a list with identifiers of fare media that are within the detection range of the transaction device. The list may include a subset of an overall population of identifiers of fare media. Each identifier of the overall population of identifiers may be associated with a particular user and biometric identifier stored on the transit system. The list may include the identifier of the user's fare media. The method may further include receiving a biometric identifier from the transaction device. The biometric identifier may have been received by the transaction device from the user of the fare media in an interaction with the transaction device. The method may include comparing the biometric identifier to biometric identifiers of only users associated with identifiers that are on the list of fare media to identify the user and a transit account associated with the user. The method may also include authorizing a transaction using the transit account associated with the identified user and communicating an authorization message to the transaction device.

In another aspect, a non-transitory computer-readable medium having instructions embedded thereon for conducting biometric transactions within a transit system is provided. The instructions may include computer code for causing a computing device to receive an indication that a fare media of a user is within a detection range of a transaction device of the transit system. The indication may include an identifier of the fare media. The instructions may also include computer code for causing a computing device to populate a list with identifiers of fare media that are within the detection range of the transaction device. The list may include a subset of an overall population of identifiers of fare media. Each identifier of the overall population of identifiers may be associated with a particular user and biometric identifier stored on the transit system. The list may include the identifier of the user's fare media. The instructions may further include computer code for causing a computing device to receive a biometric identifier from the transaction device. The biometric identifier may have been received by the transaction device from the user of the fare media in an interaction with the transaction device. The instructions may include computer code for causing a computing device to compare the biometric identifier to biometric identifiers of only users associated with identifiers that are on the list of fare media to identify the user and a transit account associated with the user. The instructions may also include computer code for causing a computing device to authorize a transaction using the transit account associated with the identified user and to communicate an authorization message to the transaction device.

In another aspect, a system for conducting biometric transactions is provided. The system may include a communications interface configured to send and receive data, a memory, and a processor. The processor may be configured to receive, using the communications interface, an indication that a media of a user is within a detection range of a transaction device. The indication may include an identifier of the media. The processor may also be configured to populate a list with identifiers of media that are within the detection range of the transaction device. The list may include a subset of an overall population of identifiers of media. Each identifier of the overall population of identifiers may be associated with a particular user and biometric identifier stored on the memory. The list may include the identifier of the user's media. The processor may be further configured to receive, using the communications interface, a biometric identifier from the transaction device. The biometric may have been received by the transaction device from the user of the media in an interaction with the transaction device. The processor may be configured to compare the biometric identifier to biometric identifiers of only users associated with identifiers that are on the list of media to identify the user and an account associated with the user. The processor may also be configured to authorize a transaction using the account associated with the identified user and to communicate an authorization message to the transaction device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
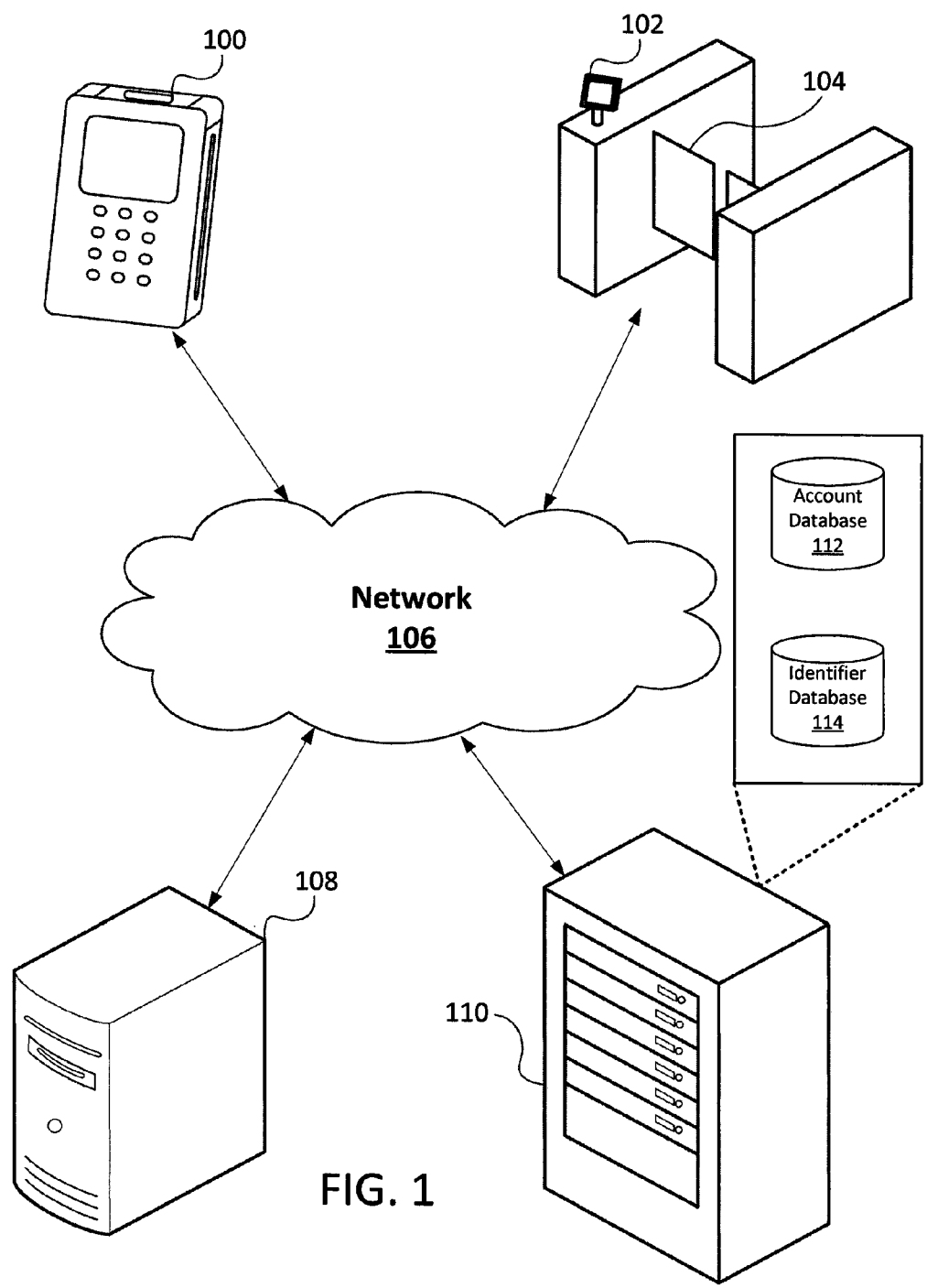
FIG. 1 is a system diagram showing a system for conducting biometric transactions according to embodiments.

For the purposes of explanation, the ensuing description provides specific details that are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments of the present invention may include biometric payment or authentication systems and methods that use a patron's location information to enhance processing speed and accuracy. The systems and methods described herein detect the presence of media within a detection range of a transaction device, such as an access point or gate, such that authentication requires comparing a biometric identifier received during a transaction to only those biometric identifiers of users near the transaction device, thus effectively reducing a size of a pool of users which with to verify the received biometric identifier against. By reducing the size of the pool of biometric identifiers and/or users, the speed of matching the biometric identifier with one stored on the system is greatly increased. Additionally, with fewer identifiers being compared, the rate of false positives is decreased.

Systems and methods described herein are especially useful in large-scale applications, especially those in which speed of user throughput is vital. Embodiments may also be implemented in small-scale applications to further increase the efficiency and accuracy of biometric authentication. While often described in relation to transit systems, it will be appreciated that the systems and methods described herein may be implemented in any application that utilizes biometric authentication.

As one example, a transit system may have hundreds of thousands of registered users. Each user may be associated with one or more accounts, access media, and/or biometric identifiers. The presence of an access media may be detected near a transaction device, such as an access point of gate. It will be appreciated that the systems and methods described herein may be utilized in Automated Fare Collection (AFC) systems as well. A message or other indication that includes an identifier of the access media may be sent to a server of the transit system. The server may then populate a list with the identifiers of detected access media. The number of detected access media may be in the dozens or less. The list may designate a subset of the overall population of registered users to user in the authentication of a user. A user wishing to gain access to the transit system may provide a biometric identifier, such as by placing a finger over a fingerprint scanner. This biometric identifier maybe compared only to those biometric identifiers associated with users who are most likely to match by virtue of being detected near the transaction device. In other words, the biometric identifier provided for access may be compared to biometric identifiers associated with users and/or media within the subset or list. In this manner, rather than comparing the biometric identifier to tens or hundreds of thousands of possible matches, the biometric identifier may be compared to a significantly smaller subset of users. Thus, the efficiency of authentication may be greatly improved. Additionally, with a fewer number of potential matches, the odds of a false positive are greatly reduced.

As another example, a patron X may register a fingerprint with a transit agency and install a transit mobile application to his smartphone. There may be Bluetooth™ Low Energy beacons or other wireless beacons positioned at each stop and/or station of the transit system. When patron X enters a station Y, the transit mobile application receives a signal from the beacon. The transit mobile application may "wake up" and notify a central server of the transit system that patron X is at station Y.

Patron X may then walk to a fare gate and touch a fingerprint scanner on the gate. The fare gate may then send data, including fingerprint data, to the server. Since the server knows which registered users are at station, it does not need to lookup data against all records in a database of all registered users. Rather, the server checks against the list of patrons at station Y first to locate a record and authenticate patron X. If a record is not found, the server may do a full lookup against the remaining data. In this manner, the system may identify patron X and authenticate the payment very quickly. Also, since the system knows patron X's phone is in proximity, the rate of false positives is reduced tremendously.

Referring now to FIG. 1, a system for biometric authentication is shown. The system may include a media 100 that may be used to interact with other components of the system via a network 106. Media 100 may be any device that is detectable using a wireless technology. Media 100 may include, for example, a mobile communications device such as a mobile phone or tablet computer, a laptop or personal computer, other computing device, a smart card or passive access device, such as a radio frequency identification (RFID) tag or fob, and/or other wireless device. Network 106 may be a local area network (LAN) and/or other private or public wired and/or wireless networks. Network 106 may utilize one or more of Wi-Fi, ZigBee, Bluetooth™, Bluetooth™ Low Energy, a cellular communications protocol such as 3G, 4G, or LTE, and/or any other wireless communications protocol. Network 106 may be communicatively coupled with one or more of the components of the system to facilitate communication between the various components. It will be appreciated that one or more different network connections may be used in accordance with the invention, and that the use of a single network 106 to enable communications is merely one example of such configurations. For example, each component may be communicatively coupled with other components using a separate network for one or more of the connections.

Media 100 is able to communicate with a transaction device 102. Transaction device 102 may be an access point or gate, such as a transit access gate. Such transactions devices 102 may include physical barriers 104, such as a physical gate, to prevent unauthorized users from entering a particular area. Communications between the media 100 and the transaction device 102 may be used to detect the presence of the media 100 within a detection range of the transaction device 102. The detection range may be selected to create an area of a size such that users of media 100 detected within the detection range are likely to approach and/or enter through the transaction device 102. In some embodiments, the detection range may be determined by a range of a wireless signal produced by the transaction device 102 and/or by a beacon positioned proximate to the transaction device 102. The detection of media 100 within the detection range or proximity of a transaction device 102 can be done in several ways.

In some embodiments, such as those where media 100 is a smart phone or similar device, a user may download and install a mobile application on the media 100. The mobile application may be provided by the operator of the transaction device 102. Upon execution, the mobile application may detect a signal from the transaction device 102 when the media 100 is within the detection range. Oftentimes, the signal may be via Bluetooth™ Wi-Fi, or other communications protocol, however, any wireless communications protocol may be used to produce the signal. Upon detecting the signal, the media 100 may communicate a message or other indication that the media 100 is within the detection zone of the transaction device 102 to a server 108. This indication may be sent using the same wireless network or a separate network as the detection signal. For example, the signal emitted from the transaction device 102 and detected by the media 100 may be from a Bluetooth™ beacon of the transaction device 102, while the indication may be communicated using an LTE antenna of the media 100. The indication may include both an identifier of the media 100 and an identifier of the transaction device 102. In systems where multiple transaction devices are used, it may be important to identify each transaction device 102 such that the server 108 may maintain lists of detected media 100 for each transaction device 102.

In some embodiments, a transaction device, such as a transit access gate, may be positioned in an area without cellular reception such that a smart phone cannot send an indication to a server when in proximity to the transaction device. For example, in subway systems, an access gate may be positioned underground where a cellular communications signal is weak and/or not present. In such embodiments, a beacon or a signal transceiver, such as a Bluetooth™ Low Energy beacon, may be positioned remote from the transaction device and in proximity to an entryway of the transit system. In a subway system, the signal transceiver may be positioned near a staircase that leads down to the subway. As a user holding an access media approaches the stairs, the media may detect a signal emitted from the signal transceiver and determine that the media is within a detection range and an indication may be sent by the media to the transit server. The server may populate lists with identifiers of media and/or users that have been detected by the beacon and/or through signal detection of the signal transceiver. As a user descends into the subway system and approaches a transaction device, they may provide a biometric identifier to be matched against biometric identifiers of detected users and/or media. In some embodiments, the lists may be updated. For example, as each user completes a transaction at the transaction device and enters a controlled access area of the transit system, an identifier associated with the user and/or media may be removed from the list of detected users and/or media.

In other embodiments, such as those where the media 100 is a smart card or passive device, the transaction device 102 may detect a signal from the media 100 indicating the media 100 is within a detection range. For example, the transaction device 102 may broadcast a signal that is modulated by the presence of media 100, such as by an antenna of media 100. The modulated signal may be unique to each media 100 such that the particular media 100 may be identified based on the modulated signal. This modulated signal may detected by the transaction device 102, which may then communicate a message or other indication to the server 108 that includes an identifier of the transaction device 102 and/or the media 100.

In other embodiments, instead of using a communication with a transaction device, a global positioning satellite (GPS) sensor of media 100 may be used to determine a location of the media 100. This location may be compared to known locations of transaction devices, such as locations stored on a mobile application provided by the operator of the transaction devices. When a media 100 is within a predetermined or detection range of a known transaction device 102, the media 100 may communicate an indication of being within the detection range to the server 108.

After a media 100 is detected within the detection range, a user of the media 100 may interact with the transaction device. The interaction may include inputting one or more biometric identifiers into the transaction device 102. This may be done by placing the user's finger or hand on a scanner to capture a fingerprint or other hand geometry. In other embodiments, the biometric identifier may incorporate facial recognition, iris and/or retinal scans, voice recognition, and the like. Any combination of one or more biometric identifiers may be used to authenticate the user. The transaction device 102 may send the captured biometric identifier to the server 108, such as by using network 106.

Upon receiving an indication from a media 100 and/or transaction device 102, the server 108 may compile a list of identifiers of media 100 present within the detection range of each transaction device. Each list may be maintained and updated by adding identifiers of each media 100 detected within the detection range and by removing identifiers associated with media 100 that are no longer within the detection range. The server 108 may retrieve biometric identifiers associated with users and/or media 100 detected within the detection range of a transaction device 102 from the identifier database 114. The server 108 may be coupled with a network attached storage (NAS) 110, which can include the one or more databases. NAS 110 stores data for the system that is used for conducting biometric transactions and performing other functions and features described herein. NAS 110 can be any type of storage device that is accessible over a network, including a storage area network (SAN). In other embodiments, the databases can be stored in server 108 rather than on a separate physical machine dedicated to data storage.

In this embodiment, NAS 110 stores an account database 112 and an identifier database 114. Account database 112 can be used to store accounts that are used for payment and access to a system, such as transit accounts in a transit system application. For example, user information, purchase history, media identifiers, one-time use tokens, and other information associated with accounts can be stored in account database 112. Identifier database 114 may include biometric identifiers associated with each registered user of the system. Databases 112 and 114 may be linked or otherwise associated with one another such that data may be cross-referenced between the two. It should be understood that account database 112 and identifier database 114 are only example databases that can be stored in NAS 110. In other embodiments, different or additional databases can also be stored. Additionally, it will be appreciated that multiple databases may be merged into a single database.

In some embodiments, the lists are used to select which biometric identifiers to retrieve from the identifier database 114. The server 108 may then compare the biometric identifier received from the transaction device 102 with the biometric identifiers retrieved from the identifier database 114 to identify and authenticate a user of the media 100. Upon authentication, the server 108 may look up and authorize an account associated with the user for a transaction requested during the user's interaction with the transaction device 102. The transaction may be authorized by determining that the user has already purchased fare or other access media to gain access into the transit system or other system. The transaction may also determine that a user has sufficient funds either in the account or with an associated payment medium, such as a credit card stored on the account, to permit the user to access the transit or other system. Upon approval, the server 108 may send an approval or authorization message to the transaction device 102. The message may cause an authorization indication to be presented on a display of the transaction device 102 and/or may cause physical barrier 104 to move to permit the user to access the system.

Figure 2:
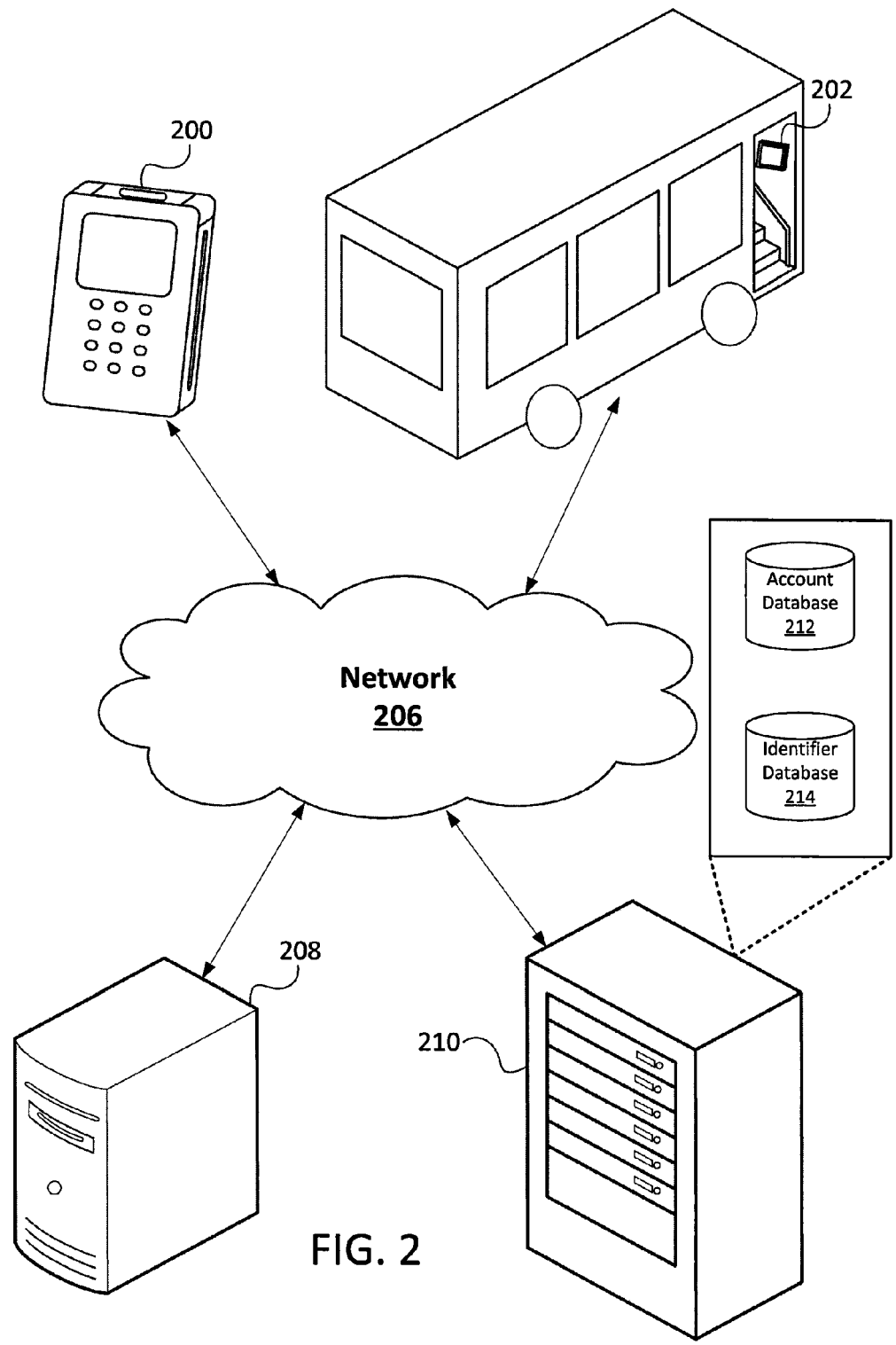
FIG. 2 is a system diagram showing a system for conducting biometric transactions according to embodiments.

FIG. 2 shows a system for biometric authentication at a transit vehicle. The system of FIG. 2 may operate similarly to the system described in FIG. 1. The system may include a media 200, similar to media 100 described above, that may be used to interact with other components of the system via a network 206. Network 206 may be similar to network 106 and may utilize one or more of Wi-Fi, ZigBee, Bluetooth™, Bluetooth™ Low Energy, high frequency sound, a cellular communications protocol such as 3G, 4G, or LTE, and/or any other wireless communications protocol. Network 206 may be communicatively coupled with one or more of the components of the system to facilitate communication between the various components. It will be appreciated that one or more different network connections may be used in accordance with the invention, and that the use of a single network 206 to enable communications is merely one example of such configurations. For example, each component may be communicatively coupled with other components using a separate network for one or more of the connections.

A transaction device 202 may be positioned at a point of entry of a transit vehicle, such as a bus or train. Such positioning allows a bus driver or other transit vehicle operator to ensure that each rider has successfully completed the authentication process. Transaction device 202 and media 200 may interact to determine when media is within a detection range of the transaction device 202. The detection range may be selected to create an area of a size such that a user of media 200 detected within the detection range is likely to ride the transit vehicle. In some embodiments, the detection range may be determined by a range of a wireless signal produced by the transaction device 202 and/or by a beacon positioned proximate to the transaction device 202. The detection of media 200 within the detection range or proximity of a transaction device 202 can be done in any of the ways described above in relation to FIG. 1.

For example, a mobile application executed on the media 200 may detect a signal from the transaction device 202 when the media 200 is within the detection range. Upon detecting the signal, the media 200 may communicate a message or other indication that the media 200 is within the detection zone of the transaction device 202 to a server 208. In other embodiments, such as those where the media 200 is a smart card or passive device, the transaction device 202 may detect a signal from the media 200 indicating the media 200 is within a detection range. For example, the transaction device 202 may broadcast a signal that is modulated by the presence of media 200. The modulated signal may be unique to each media 200 such that the particular media 200 may be identified. This modulated signal may detected by the transaction device 202, which may then communicate a message or other indication to the server 208 that includes an identifier of the transaction device 202 and/or the media 200. In other embodiments, a GPS sensor of media 200 may be used to determine a location of the media 200. This location information may be compared to a location of a transaction device 202 on the transit vehicle. The vehicle and/or transaction device location may be determined based on a GPS sensors of the vehicle and/or transaction device 202 or may be determined based on a vehicle's proximity to a beacon at a transit stop. For example, a bus may detect a signal emitted from a beacon positioned at a transit stop. Based on this signal, the transaction device 202 may detect a stop or location of the vehicle. The media 200 and/or transaction device 202 may share their respective locations with one another to determine if the media 200 is within a detection range. When a media 200 is within a predetermined or detection range of the transaction device 202, the media 200 and/or transaction device 202 may communicate an indication of being within the detection range to the server 208.

After a media 200 is detected within the detection range, a user of the media 200 may interact with the transaction device. In this embodiment, the interaction may include inputting one or more biometric identifiers into the transaction device 202. This may be done by placing the user's finger or hand on a scanner to capture a fingerprint or other hand geometry. In other embodiments, the biometric identifier may incorporate facial recognition, iris and/or retinal scans, voice recognition, and the like. Any combination of one or more biometric identifiers may be used to authenticate the user. The transaction device 202 may send the captured biometric identifier to the server 208, such as by using network 206.

Upon receiving an indication from a media 200 and/or transaction device 202, the server 208 may compile a list of identifiers of media 200 present within the detection range of each transaction device. Each list may be maintained and updated by adding identifiers of each media 200 detected within the detection range and by removing identifiers associated with media 200 that are no longer within the detection range. The server 208 may be coupled with a network attached storage (NAS) 210, which can include one or more databases. NAS 210 stores data for the system that is used for conducting biometric transactions and performing other functions and features described herein. NAS 210 can be any type of storage device that is accessible over a network, including a storage area network (SAN). In other embodiments, the databases can be stored in server 208 rather than on a separate physical machine dedicated to data storage.

In this embodiment, NAS 210 stores an account database 212 and an identifier database 214 as described in relation to FIG. 1. It should be understood that account database 212 and identifier database 214 are only example databases that can be stored in NAS 210. In other embodiments, different or additional databases can also be stored. Additionally, it will be appreciated that multiple databases may be merged into a single database.

The server 208 may retrieve biometric identifiers associated with users and/or media 200 detected within the detection range of a transaction device 202 from the identifier database 214. In some embodiments, this means using the identifiers on the lists to select which users' biometric identifiers to retrieve from the identifier database. The server 208 may then compare the biometric identifier received from the transaction device 202 with the biometric identifiers retrieved from the identifier database 214 to identify and authenticate a user of the media 200. Upon authentication, the server 208 may authorize an account associated with the user for a transaction requested during the user's interaction with the transaction device 202. The transaction may be authorized by determining that the user has already purchased fare or other access media to gain access into the transit or other system. The transaction may also determine that a user has sufficient funds either in the account or with an associated payment medium, such as a credit card stored on the account, to permit the user to access the transit or other system. Upon approval, the server 208 may send an approval or authorization message to the transaction device 202. The message may cause an authorization indication to be presented on a display or other component of the transaction device 202 and/or transit vehicle. By showing the authorization indication or approval message on the display or other component, an operator of the transit vehicle may visually verify that each rider has been approved.

Figure 3:
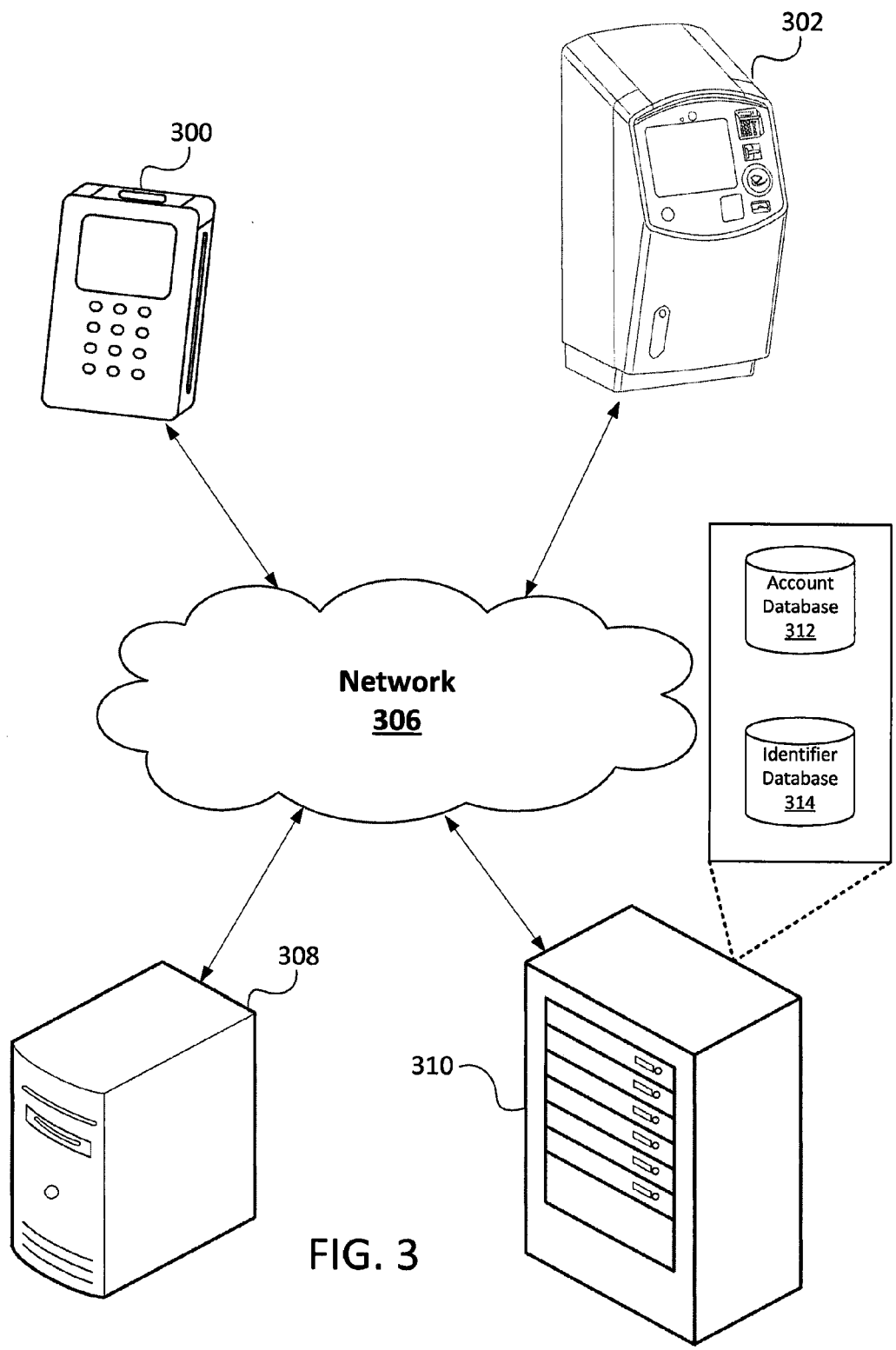
FIG. 3 is a system diagram showing a system for conducting biometric transactions according to embodiments.

FIG. 3 shows a system for biometric authentication at a access media or other vending machine. This enables an account user to be authenticated biometrically when completing transactions such as the purchase of fare media, access media, and the like. The system of FIG. 3 may operate similarly to the systems described in FIGS. 1 and 2. The system may include a media 300, similar to media 100 described above, that may be used to interact with other components of the system via a network 306. Network 306 may be similar to network 106 and may utilize one or more of Wi-Fi, ZigBee, Bluetooth™, Bluetooth™ Low Energy, high frequency sound, a cellular communications protocol such as 3G, 4G, or LTE, and/or any other wireless communications protocol. Network 306 may be communicatively coupled with one or more of the components of the system to facilitate communication between the various components. It will be appreciated that one or more different network connections may be used in accordance with the invention, and that the use of a single network 306 to enable communications is merely one example of such configurations. For example, each component may be communicatively coupled with other components using a separate network for one or more of the connections.

A transaction device 302 may be a vending machine and/or attached to a vending machine. Transaction device 302 and media 300 may interact to determine when media is within a detection range of the transaction device 302. The detection range may be selected to create an area of a size such that a user of media 300 detected within the detection range is likely to conduct a purchase transaction or other transaction at transaction device 302. In some embodiments, the detection range may be determined by a range of a wireless signal produced by the transaction device 302 and/or by a beacon positioned proximate to the transaction device 302. The detection of media 300 within the detection range or proximity of a transaction device 302 can be done in any of the ways described above in relation to FIG. 1.

For example, a mobile application executed on the media 300 may detect a signal from the transaction device 302 when the media 300 is within the detection range. Upon detecting the signal, the media 300 may communicate a message or other indication that the media 300 is within the detection zone of the transaction device 302 to a server 308. The indication may include both an identifier of the media 300 and an identifier of the transaction device 302. In other embodiments, such as those where the media 300 is a smart card or passive device, the transaction device 302 may detect a signal from the media 300 indicating the media 300 is within a detection range. For example, the transaction device 302 may broadcast a signal that is modulated by the presence of media 300. The modulated signal may be unique to each media 300 such that the particular media 300 may be identified. This modulated signal may detected by the transaction device 302, which may then communicate a message or other indication to the server 308 that includes an identifier of the transaction device 302 and/or the media 300. In other embodiments, instead of using a communication with a transaction device, GPS sensor of media 300 may be used to determine a location of the media 300. This location information may be compared to known locations of transaction devices, such as locations stored on a mobile application provided by the operator of the transaction devices. When a media 300 is within a predetermined or detection range of a known transaction device 302, the media 300 may communicate an indication of being within the detection range to the server 308. When a media 300 is within a predetermined or detection range of the transaction device 302, the media 300 and/or transaction device 302 may communicate an indication of being within the detection range to the server 308.

After a media 300 is detected within the detection range, a user of the media 300 may interact with the transaction device. In this embodiment, the interaction may include inputting one or more biometric identifiers into the transaction device 302. This may be done by placing the user's finger or hand on a scanner to capture a fingerprint or other hand geometry. In other embodiments, the biometric identifier may incorporate facial recognition, iris and/or retinal scans, voice recognition, and the like. Any combination of one or more biometric identifiers may be used to authenticate the user. The transaction device 302 may send the captured biometric identifier to the server 308, such as by using network 306.

Upon receiving an indication from a media 300 and/or transaction device 302, the server 308 may compile a list of identifiers of media 300 present within the detection range of each transaction device. Each list may be maintained and updated by adding identifiers of each media 300 detected within the detection range and by removing identifiers associated with media 300 that are no longer within the detection range. The server 308 may be coupled with a network attached storage (NAS) 310, which can include one or more databases. NAS 310 stores data for the system that is used for conducting biometric transactions and performing other functions and features described herein. NAS 310 can be any type of storage device that is accessible over a network, including a storage area network (SAN). In other embodiments, the databases can be stored in server 308 rather than on a separate physical machine dedicated to data storage.

In this embodiment, NAS 310 stores an account database 312 and an identifier database 314 as described in relation to FIG. 1. It should be understood that account database 312 and identifier database 314 are only example databases that can be stored in NAS 310. In other embodiments, different or additional databases can also be stored. Additionally, it will be appreciated that multiple databases may be merged into a single database.

The server 308 may retrieve biometric identifiers associated with users and/or media 300 detected within the detection range of a transaction device 302 from the identifier database 314. In some embodiments, this means using the lists of identifiers of detected media and/or detected users to select which biometric identifiers to retrieve from the identifier database. The server 308 may then compare the biometric identifier received from the transaction device 302 with the biometric identifiers retrieved from the identifier database 314 to identify and authenticate a user of the media 300. Upon authentication, the server 308 may authorize an account associated with the user for a transaction requested during the user's interaction with the transaction device 302. The transaction may be authorized by determining that the user has sufficient funds either in the account or with an associated payment medium, such as a credit card stored on the account, to permit the user to purchase fare media, access media, and/or other products. Upon approval, the server 308 may send an approval or authorization message to the transaction device 302. The message may cause an authorization indication to be presented on a display or other component of the transaction device 302. Additionally, the approval message may cause a fare media, access media, and/or other product to be issued from the transaction device 102 and/or vending machine. For example, a transit product may be added to the user's account, a physical ticket or card may be issued, and/or other issuance may be triggered.

Figure 4:
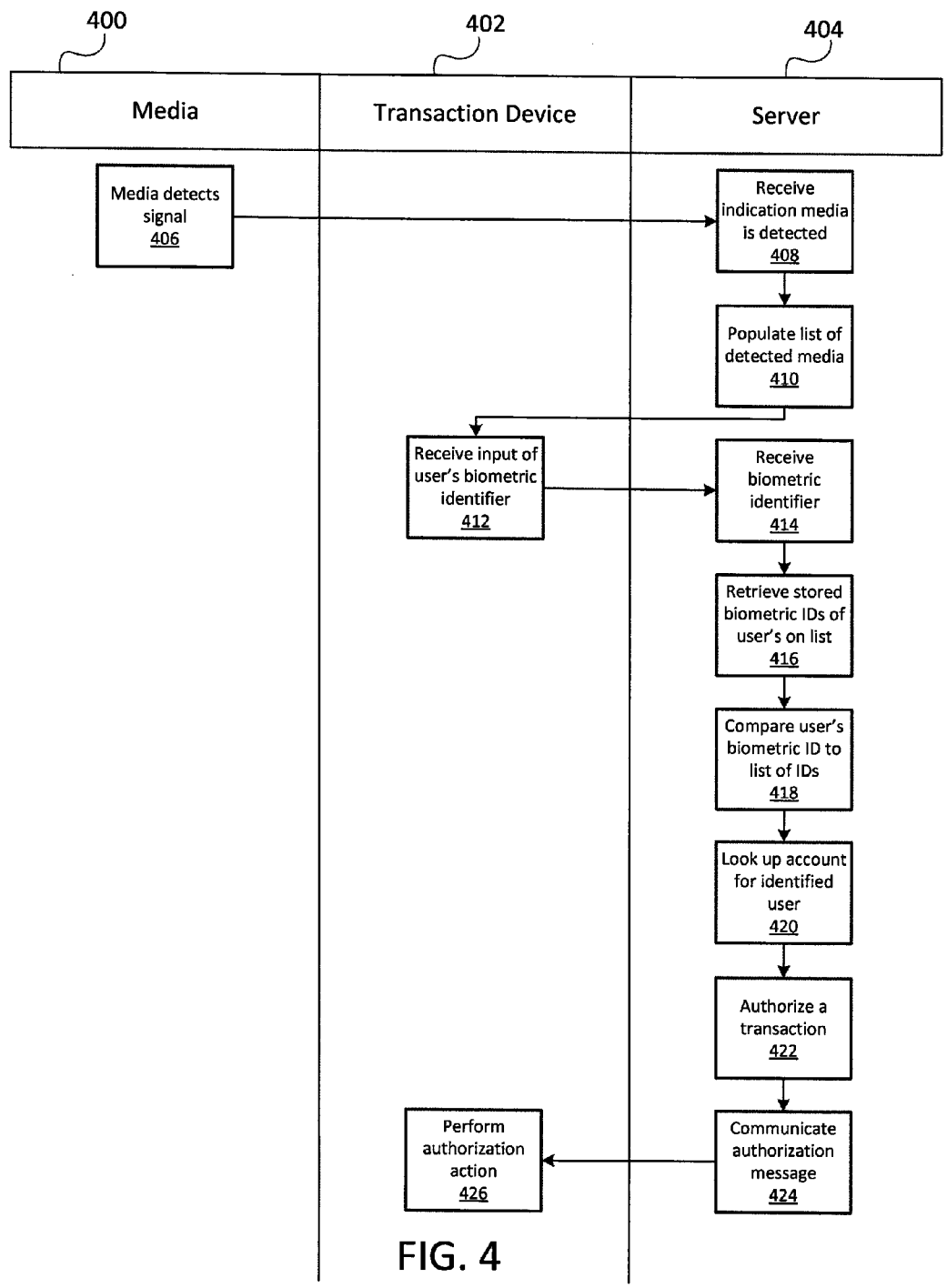
FIG. 4 shows a swim lane diagram for a process of conducting biometric transactions according to embodiments.

FIG. 4 depicts a swim lane diagram of a process of biometric authentication to conduct a transaction. The process may be performed within any of the systems of FIG. 1-3, and/or may be performed in systems not described herein. At block 406, a media 400 detects that it is within a detection range of a transaction device 402. Media 400 may be any device that is detectable using a wireless technology, such as a mobile communications device such as a mobile phone or tablet computer, a laptop or personal computer, other computing device, a smart card or passive access device, such as a radio frequency identification (RFID) tag or fob, and/or other wireless device. Transaction devices 402 may be standalone devices positioned near access points of secured areas, components of access points, vending machines, other devices that utilize biometric authentication, and/or devices positioned near locations where biometric authentication is used. The detection of a media 400 within a detection range of transaction device 402 may be done in several ways.

In some embodiments, such as those where media 400 is a smart phone or similar device, a mobile application executed on the media 400 may detect a signal from the transaction device 402 when the media 400 is within the detection range. Oftentimes, the signal may be via Bluetooth™ Wi-Fi, or other communications protocol, however, any wireless communications protocol may be used to produce the signal. In other embodiments, such as those where the media 400 is a smart card or passive device, the transaction device 402 may detect a signal from the media 400 indicating the media 400 is within a detection range. For example, the transaction device 402 may broadcast a signal that is modulated by the presence of media 400. The modulated signal may be unique to each media 400 such that the particular media 400 may be identified. This modulated signal may detected by the transaction device 402. In other embodiments, a GPS sensor of media 400 may be used to determine a location of the media 400. This location information may be compared to known locations of transaction devices to determine when the media 400 is within the detection range.

At block 408, a server 404 or other computing device receives an indication that the media 400 is within the detection range of the transaction device 402. This indication may be received from the media 400, the transaction device, or both. The indication may include an identifier of the media 400, and in some cases, an identifier of the transaction device 402. Upon receipt, the server 404 may populate a list with the identifiers of any media within the detection range at block 410. Lists may be maintained and updated for each transaction device. In updating the lists, the server 404 removes media identifiers for media no longer within the detection range while adding media identifiers for newly discovered media within the detection range. At block 412, a user of the media 400 may input a biometric identifier into the transaction device 402. This may be done by placing the user's finger or hand on a scanner to capture a fingerprint or other hand geometry. In other embodiments, the biometric identifier may incorporate facial recognition, iris and/or retinal scans, voice recognition, and the like. Any combination of one or more biometric identifiers may be used to authenticate the user. The transaction device 402 may send the captured biometric identifier to the server 408, such as by using network 406. The captured biometric identifier may be sent to server 404, which receives the biometric identifier at block 414.

The server 404 may then retrieve stored biometric identifiers of users associated with the media identifiers on the list related to the transaction device 402. The server 404 may have biometric identifiers for each user registered with a system, such as a transit system. The list includes only a subset of the identifiers of all users, thus greatly reducing the number of biometric identifiers to compare to the biometric identifier captured by the transaction device 402. In some embodiments, the entire population of biometric identifiers may be stored on a database remote from the server 404. Upon retrieval of the biometric identifiers of users associated with the media identifiers on the list, the server 404 may compare the captured biometric identifier to the retrieved identifiers at block 418. The server 404 may then verify that the captured biometric identifier matches a single retrieved biometric identifier to authenticate the user.

At block 420, an account related to the authenticated user may be retrieved. A transaction may be authorized based on information associated with the account at block 422. For example, the transaction may include a request for access to a restricted area, such as a secure facility or an area for paid customers. Such a transaction may be authorized by determining that the user has already purchased fare or other access media to gain access into the area and/or that the person has been otherwise cleared for access. The transaction authorization may also determine that a user has sufficient funds either in the account or with an associated payment medium, such as a credit card stored on the account, to permit the user to access the transit or other system. In some embodiments, the transaction may include a request to purchase access media or other products. The transaction may be authorized by determining that the user has sufficient funds either in the account or with an associated payment medium, such as a credit card stored on the account, to permit the user to purchase fare media, access media, and/or other products.

At block 424, an authorization message may be communicated to the transaction device 402. The transaction device 402 may then perform an authorization action at block 426. Authorization actions may be caused by the receipt of the authorization message, and may include presenting an approval message on a display or other component of the transaction device 402 and/or moving a physical barrier of the transaction device 402 or other system infrastructure to permit the authenticated user to access the system. In other embodiments, the authorization action may include a fare media, access media, and/or other product to be issued from the transaction device 402 and/or a corresponding vending machine. For example, a transit product may be added to the user's account, a physical ticket or card may be issued, and/or other issuance may be triggered.

Figure 5:
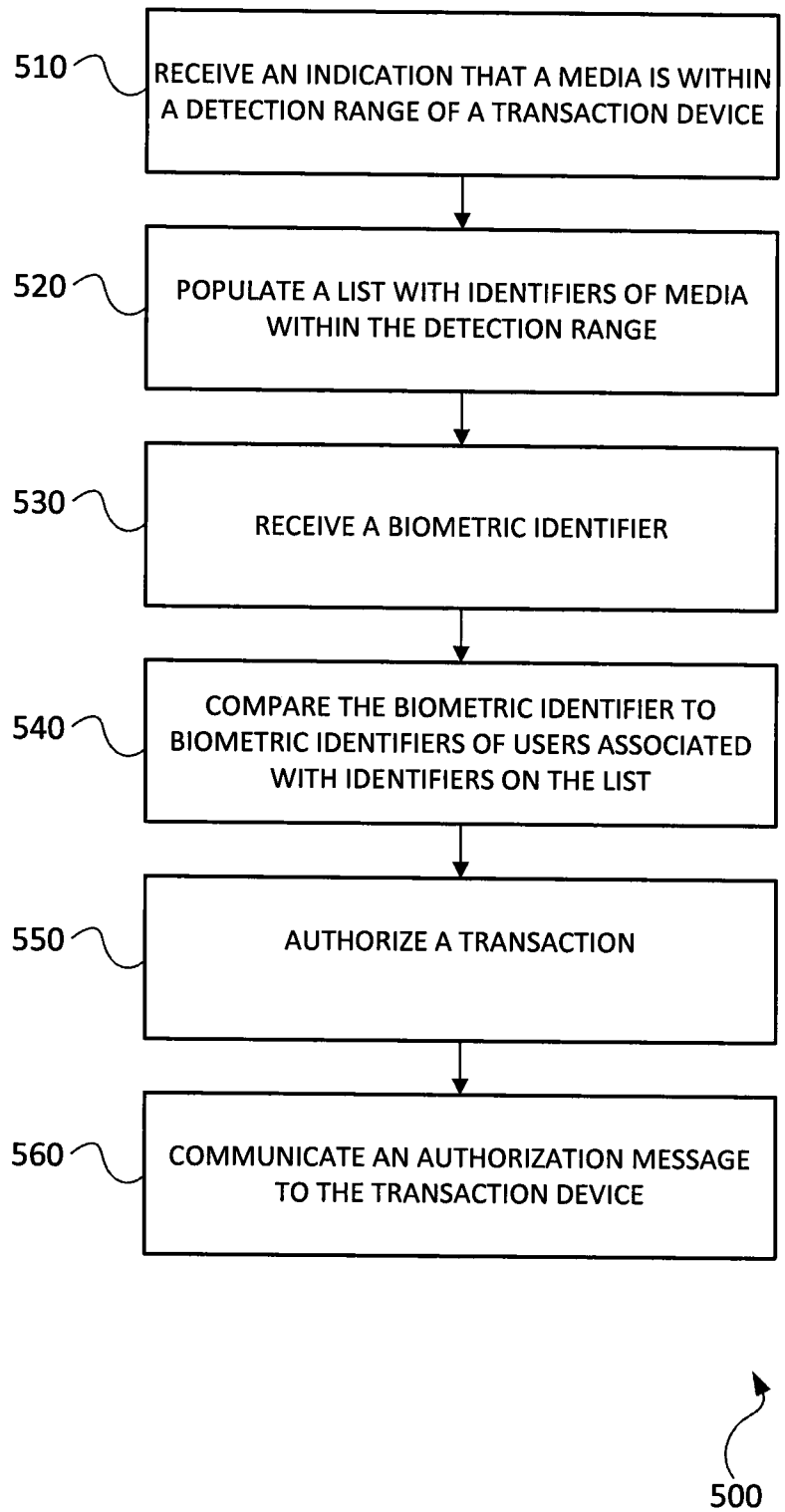
FIG. 5 depicts a process for conducting biometric transactions according to embodiments.

FIG. 5 is a flowchart depicting a process 500 for conducting biometric transactions at transaction devices. In some embodiments, a transaction may be for the purchase of a transit fare, other access media, and/or other product from a vending machine or other transaction device. In other embodiments, the transaction may be a request to access a secure area, such as an area for paid customers and/or for users that have been otherwise cleared for access. Such transactions may be conducted using access control points, gates, and/or other similar transaction devices. Process 500 may be performed by a server or other computing device, such as server 108, 208, 308, and/or 404. Process 500 may be similar to those performed in the systems described in FIGS. 1-3 and the process described in FIG. 4. The process 500 may include receiving an indication that a fare media of a user is within a detection range of a transaction device of the transit system at block 510. The indication may include an identifier of the fare media, and in some embodiments, an identifier of the transaction device. In some embodiments, the indication may be received from the fare media upon the fare media detecting a signal from the transaction device when the fare media is within the detection range. In other embodiments, the indication may be received from the transaction device upon the transaction device detecting a signal indicating the presence of the fare media within the detection range.

At block 520 a list may be populated with identifiers of fare media that are within the detection range of the transaction device, including the identifier received at block 510. The list may include a subset of an overall population of identifiers of fare media. For example, each registered user (potentially hundreds of thousands) of a transit system may be associated with a media identifier, a biometric identifier, and/or a transit account. The subset of media represented on the list may be a small percentage of the overall user population, as the list may only include a few dozen or fewer media and/or users. In some embodiments, the list may be updated by removing identifiers of fare media no longer within the detection range and by adding identifiers of fare media newly detected within the detection range.

At block 530, a biometric identifier may be received from the transaction device. The biometric identifier is received by the transaction device from the user of the fare media in an interaction with the transaction device. As one example, to request access to a transit system, a user may scan his fingerprint at the transaction device. Biometric identifiers may include one or more of a facial scan, a fingerprint, a retinal scan, an iris scan, a voice sample, a photograph, or a hand geometry scan. The biometric identifier received from the transaction device may be compared to biometric identifiers of only users associated with identifiers that are on the list of fare media at block 540 to identify and/or verify the user and a transit account associated with the user. At block 550, a transaction using the transit account associated with the identified user may be authorized. For example, the transaction may include a request for access to a restricted area, such as a secure facility or an area for paid customers. Such a transaction may be authorized by determining that the user has already purchased fare or other access media to gain access into the area and/or that the person has been otherwise cleared for access. The transaction authorization may also determine that a user has sufficient funds either in the account or with an associated payment medium, such as a credit card stored on the account, to permit the user to access the transit or other system. In some embodiments, the transaction may include a request to purchase access media or other products. The transaction may be authorized by determining that the user has sufficient funds either in the account or with an associated payment medium, such as a credit card stored on the account, to permit the user to purchase fare media, access media, and/or other products.

An authorization message may be communicated to the transaction device at block 560. The authorization message may cause an authorization action to be performed. For example, the authorization message may cause an approval message to be presented on a display or other component of the transaction device, a physical barrier of the transaction device or other system infrastructure to be moved to permit the authenticated user to access the system, and/or a fare media, access media, and/or other product to be issued from the transaction device and/or a corresponding vending machine.

Figure 6:
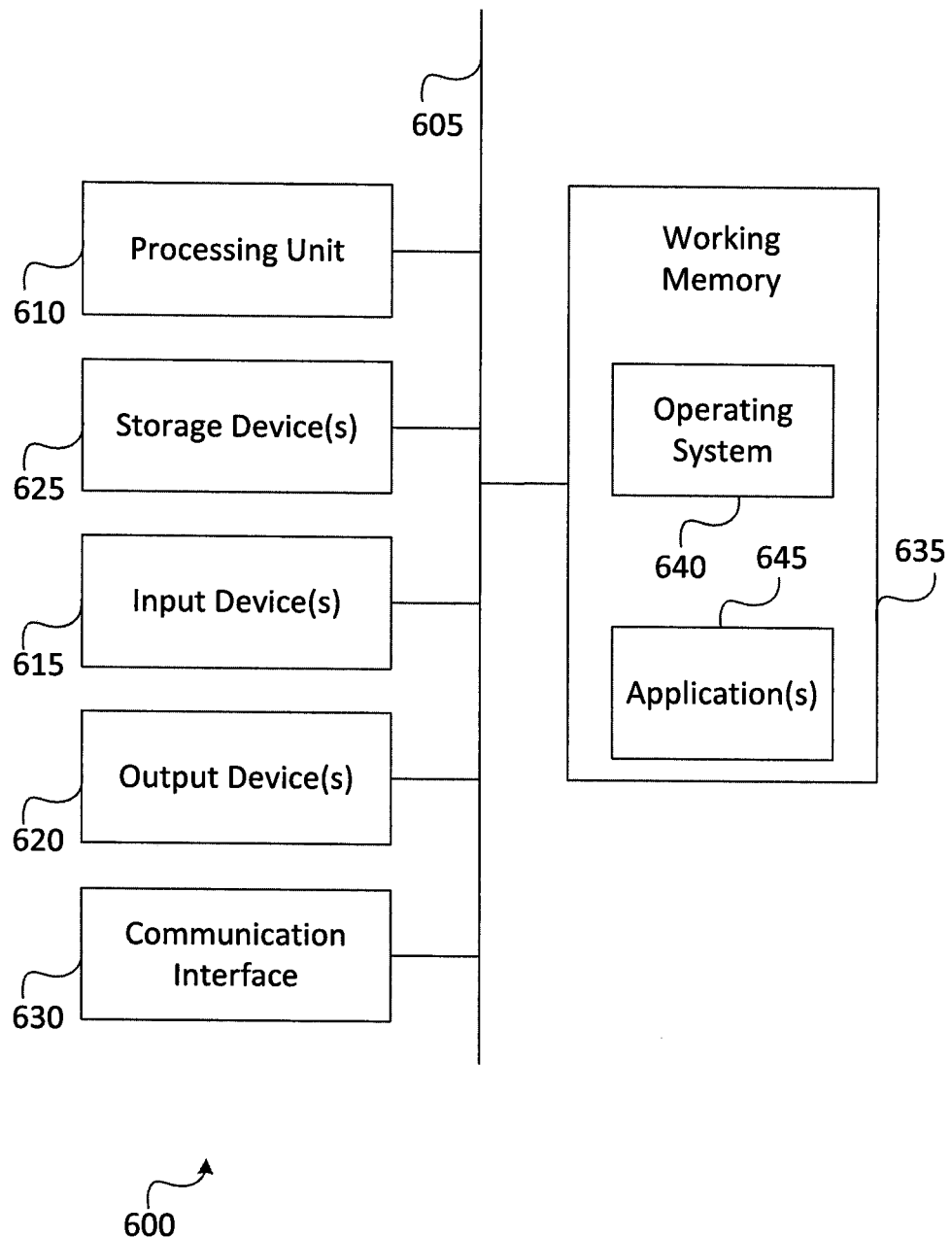
FIG. 6 is a block diagram of an example computing system according to embodiments.

A computer system as illustrated in FIG. 6 may be incorporated as part of the previously described computerized devices. For example, computer system 600 can represent some of the components of the media 100, 200, 300, and 400, servers 108, 208, 308, and 404, and/or transaction devices 102, 202, 302, and 402 as described herein. FIG. 6 provides a schematic illustration of one embodiment of a computer system 600 that can perform the methods provided by various other embodiments, as described herein, and/or can function as the host computer system, a remote kiosk/terminal, a ticket vending machine or other point-of-sale device, a mobile device, and/or a computer system. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more general-purpose processors and/or one or more special-purpose processors (such as digital signal processing chips, graphics acceleration processors, and/or the like); one or more input devices 615, which can include without limitation a mouse, a keyboard, a touchscreen, receiver, a motion sensor, a camera, a smartcard reader, a contactless media reader, and/or the like; and one or more output devices 630, which can include without limitation a display device, a speaker, a printer, a writing module, and/or the like.

The computer system 600 may further include (and/or be in communication with) one or more non-transitory storage devices 635, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 503.11 device, a Wi-Fi device, a WiMax device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 635 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 635. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 635. Volatile media include, without limitation, dynamic memory, such as the working memory 635. Transmission media include, without limitation, coaxial cables, copper wire and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 635 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for conducting biometric transactions within a transit system, the method comprising:
receiving, by a wireless beacon of a transaction device of the transit system, an indication that a fare media of a user is within a detection range of the transaction device, the indication comprising an identifier of the fare media, wherein the detection range is defined by a signal range of a beacon of the transaction device;
populating a list, prior to completion of a transaction, with identifiers of only fare media that are presently within the detection range of the transaction device, wherein the list comprises a subset of an overall population of identifiers of fare media in which each identifier in the subset is presently detected within the detection range of the transaction device, wherein each identifier of the overall population of identifiers is associated with a particular user and biometric identifier stored on the transit system, and wherein the list comprises the identifier of the user's fare media;
receiving a biometric identifier from the transaction device, the biometric identifier having been received by the transaction device from the user of the fare media in an interaction with the transaction device;
comparing the biometric identifier to biometric identifiers of only users associated with identifiers that are on the list of fare media to identify the user and a transit account associated with the user;
authorizing the transaction using the transit account associated with the identified user; and
communicating an authorization message to the transaction device.

2. The method for conducting biometric transactions within a transit system of claim 1, wherein:
the transaction device comprises a fare media vending machine; and
the transaction comprises a purchase of a transit fare.

3. The method for conducting biometric transactions within a transit system of claim 1, wherein:
the transaction device comprises a transit system access point; and
the transaction comprises a request for the user to access the transit system.

4. The method for conducting biometric transactions within a transit system of claim 1, wherein:
the authorization message causes a physical barrier of the transaction device to move to allow the user to access the transit system.

5. The method for conducting biometric transactions within a transit system of claim 1, wherein:
the authorization message causes an approval message to be produced on a display of the transaction device.

6. The method for conducting biometric transactions within a transit system of claim 1, wherein:
the indication is received from the fare media upon the fare media detecting a signal from the transaction device when the fare media is within the detection range.

7. The method for conducting biometric transactions within a transit system of claim 1, wherein:
the indication is received from the transaction device upon the transaction device detecting a signal indicating the presence of the fare media within the detection range.

8. A non-transitory computer-readable medium having instructions embedded thereon for conducting biometric transactions within a transit system, the instructions comprising computer code for causing a computing device to:
receive, by a wireless beacon of a transaction device of the transit system, an indication that a fare media of a user is within a detection range of the transaction device, the indication comprising an identifier of the fare media, wherein the detection range is defined by a signal range of a beacon of the transaction device;
populate a list, prior to completion of a transaction, with identifiers of only fare media that are presently within the detection range of the transaction device, wherein the list comprises a subset of an overall population of identifiers of fare media in which each identifier in the subset is presently detected within the detection range of the transaction device, wherein each identifier of the overall population of identifiers is associated with a particular user and biometric identifier stored on the transit system, and wherein the list comprises the identifier of the user's fare media;
receive a biometric identifier from the transaction device, the biometric identifier having been received by the transaction device from the user of the fare media in an interaction with the transaction device;
compare the biometric identifier to biometric identifiers of only users associated with identifiers that are on the list of fare media to identify the user and a transit account associated with the user;
authorize the transaction using the transit account associated with the identified user; and
communicate an authorization message to the transaction device.

9. The non-transitory computer-readable medium of claim 8, wherein:
the transaction device comprises a fare media vending machine; and
the transaction comprises a purchase of a transit fare.

10. The non-transitory computer-readable medium of claim 8, wherein:
the transaction device comprises a transit system access point; and
the transaction comprises a request for the user to access the transit system.

11. The non-transitory computer-readable medium of claim 8, wherein:
the biometric identifier comprises one or more of facial scan, a fingerprint, a retinal scan, an iris scan, a voice sample, a photograph, or a hand geometry scan.

12. The non-transitory computer-readable medium of claim 8, further comprising instructions for causing the computing device to:
update the list by removing identifiers of fare media no longer within the detection range and by adding identifiers of fare media newly detected within the detection range.

13. The non-transitory computer-readable medium of claim 8, wherein:
the indication is received from the fare media upon the fare media detecting a signal from the transaction device when the fare media is within the detection range.

14. The non-transitory computer-readable medium of claim 8, wherein:
the indication is received from the transaction device upon the transaction device detecting a signal indicating the presence of the fare media within the detection range.

15. A system for conducting biometric transactions, the system comprising:
a communications interface configured to send and receive data;
a memory; and
a processor configured to:
receive, using the communications interface, an indication that a media of a user is within a detection range of a transaction device, the indication comprising an identifier of the media, wherein the detection range is defined by a signal range of a beacon of the communications interface;
populate a list, prior to completion of a transaction, with identifiers of only media that are presently within the detection range of the transaction device, wherein the list comprises a subset of an overall population of identifiers of media in which each identifier in the subset is presently detected within the detection range of the transaction device, wherein each identifier of the overall population of identifiers is associated with a particular user and biometric identifier stored on the memory, and wherein the list comprises the identifier of the user's media;
receive, using the communications interface, a biometric identifier from the transaction device, the biometric identifier having been received by the transaction device from the user of the media in an interaction with the transaction device;
compare the biometric identifier to biometric identifiers of only users associated with identifiers that are on the list of media to identify the user and an account associated with the user;
authorize the transaction using the account associated with the identified user; and
communicate, using the communications interface, an authorization message to the transaction device.

16. The system for conducting biometric transactions of claim 15, wherein:
the transaction device comprises a fare media vending machine; and
the transaction comprises a purchase of a transit fare.

17. The system for conducting biometric transactions of claim 15, wherein:
the transaction device comprises a transit system access point; and
the transaction comprises a request for the user to access the transit system.

18. The system for conducting biometric transactions of claim 15, wherein:
the biometric identifier comprises one or more of facial scan, a fingerprint, a retinal scan, an iris scan, a voice sample, a photograph, or a hand geometry scan.

19. The system for conducting biometric transactions of claim 15, wherein:
the indication is received from the media upon the media detecting a signal from the transaction device when the media is within the detection range.

20. The system for conducting biometric transactions of claim 15, wherein:
the indication is received from the transaction device upon the transaction device detecting a signal indicating the presence of the media within the detection range.

* * * * *